United States Patent [19]

Maturi et al.

[11] Patent Number: 5,610,659
[45] Date of Patent: Mar. 11, 1997

[54] MPEG ENCODER THAT CONCURRENTLY DETERMINES VIDEO DATA ENCODING FORMAT AND RATE CONTROL

[75] Inventors: Gregory C. Maturi, San Jose; Sho L. Chen, Saratoga; Vivek Bhargava, San Jose; Ren-Yuh Wang, Los Altos; Richard H. Tom, Cupertino, all of Calif.

[73] Assignee: FutureTel, Inc., Sunnyvale, Calif.

[21] Appl. No.: 436,514

[22] Filed: May 8, 1995

[51] Int. Cl.⁶ .................................................. H04N 7/26
[52] U.S. Cl. ............................................. 348/42; 348/396
[58] Field of Search .................................. 348/390, 394, 348/395, 409, 411, 412, 415, 420, 396; 364/514 R, 514 A

[56] References Cited

U.S. PATENT DOCUMENTS

| | | | |
|---|---|---|---|
| 5,134,478 | 7/1992 | Golin | 358/136 |
| 5,144,424 | 9/1992 | Savatier | 358/133 |
| 5,144,429 | 9/1992 | Haghiri et al. | 358/138 |
| 5,193,004 | 3/1992 | Wang et al. | 358/136 |
| 5,200,820 | 4/1993 | Gharavi | 358/105 |
| 5,247,363 | 9/1993 | Sun et al. | 358/167 |
| 5,301,019 | 4/1994 | Citta | 348/416 |
| 5,339,108 | 8/1994 | Coleman et al. | 348/408 |
| 5,493,514 | 2/1996 | Keith et al. | 364/514 R |

OTHER PUBLICATIONS

Eddy, Chris. "The MPEG Compression Algorithm", *PC Graphics & Video*. Jul. 1994, pp. 52–55.

MPEG Software Simulation Group. "MPEG-2 Encoder/Decoder" Jun. 1994.

MPEG Software Simulation Group. "Makefile for mpeg2encode." 1994.

"ISO/IEC 13818-2:1995(E)" Recommendation ITU-TH.262(1995E). 1995.

"ISO/IEC/JTC1/SC29/WG11 Coded Representation of Picture and Audio Information, Test Model 5" Document AVC-491. Version 1. Apr. 1993.

*Primary Examiner*—Amelia Au
*Attorney, Agent, or Firm*—Donald E. Schreiber

[57] ABSTRACT

A coding conditions selection apparatus, adapted for inclusion in an MPEG-II encoder chip, and methods for selecting encoding parameters for a macroblock of video data includes an encoder decision block ("EDB") for receiving and concurrently stratifying into a plurality of blocks digital video data associated with a macroblock. Each block may correspond to video data for pels of the macroblock, or a block may correspond to differences produced by subtracting digital video data for pels of a reference frame of video from digital video data for pels of the macroblock. The EDB while evaluating functions, e.g. either a variance or a mean square error, concurrently processes the stratified data for several blocks while avoiding any redundant computations. A plurality of encoding conditions are determined based upon the block function evaluations.

21 Claims, 4 Drawing Sheets

MPEG ENCODER THAT CONCURRENTLY DETERMINES VIDEO DATA ENCODING FORMAT AND RATE CONTROL

BACKGROUND OF THE INVENTION

1. Field of the Invention

The present invention pertains to video image compression. Specifically, the present invention pertains to an apparatus and method for efficiently and concurrently determining a plurality of conditions used in encoding video data in accordance with an MPEG-II protocol.

2. Description of the Prior Art

MPEG is a video signal compression standard, established by the Moving Picture Experts Group ("MPEG") of the International Standardization Organization. MPEG is a multistage algorithm that integrates a number of well known data compression techniques into a single system. These include motion-compensated predictive coding, discrete cosine transform ("DCT"), adaptive quantization, and variable length coding ("VLC"). The main objective of MPEG is to remove redundancy which normally exists in the spatial domain (within a frame of video) as well as in the temporal domain (frame-to-frame), while allowing inter-frame compression and interleaved audio. An MPEG-I decoder is specified in ISO Recommendation ITU-T H.262 (1995 E), dated January 1995. A prototype MPEG-2 encoder is specified in the ISO document "Test Model 5" Document AVC-491, Version 1, dated April, 1993, and a prototype software MPEG-II encoder is published by the MPEG Software Simulation Group. The preceding ISO publications and the prototype software MPEG-II encoder are hereby incorporated by reference.

There are two basic forms of video signals: an interlaced scan signal and a non-interlaced scan signal. An interlaced scan signal is a technique employed in television systems in which every television frame consists of two fields referred to as an odd-field and an even-field. Each field scans the entire picture from side to side and top to bottom. However, the horizontal scan lines of one (e.g., odd) field are positioned half way between the horizontal scan lines of the other (e.g., even) field. Interlaced scan signals are typically used in broadcast television ("TV") and high definition television ("HDTV"). Non-interlaced scan signals are typically used in computer systems and when compressed have data rates up to 1.8 Mb/sec for combined video and audio. The Moving Picture Experts Group has established an MPEG-I protocol intended for use in compressing/decompressing non-interlaced video signals, and an MPEG-II protocol intended for use in compressing/decompressing interlaced TV and HDTV signals Before a conventional video signal may be compressed in accordance with either MPEG protocol it must first be digitized. The digitization process produces digital video data which specifies the intensity and color of the video image at specific locations in the video image that are referred to as pels. Each pel is associated with a coordinate positioned among an array of coordinates arranged in vertical columns and horizontal rows. Each pel's coordinate is defined by an intersection of a vertical column with a horizontal row. In converting each frame of video into a frame of digital video data, scan lines of the two interlaced fields making up a frame of un-digitized video are interdigitated in a single matrix of digital data. Interdigitization of the digital video data causes pels of a scan line from an odd-field to have odd row coordinates in the frame of digital video data. Similarly, interdigitization of the digital video data causes pels of a scan line from an even-field to have even row coordinates in the frame of digital video data.

Referring to FIG. 1, MPEG-I and MPEG-II each divides a video input signal, generally a successive occurrence of frames, into sequences or groups of frames ("GOF") 10, also referred to as a group of pictures ("GOP"). The frames in respective GOFs 10 are encoded into a specific format. Respective frames of encoded data are divided into slices 12 representing, for example, sixteen image lines 14. Each slice 12 is divided into macroblocks 16 each of which represents, for example, a 16×16 matrix of pels. Each macroblock 16 is divided into 6 blocks including four blocks 18 relating to luminance data and two blocks 20 relating to chrominance data. The MPEG-II protocol encodes luminance and chrominance data are encoded separately and then combines the encoded video data into a compressed video stream. The luminance blocks relate to respective 8×8 matrices of pels 21. Each chrominance block includes an 8×8 matrix of data relating to the entire 16×16 matrix of pels, represented by the macroblock. After the video data is encoded it is then compressed, buffered, modulated and finally transmitted to a decoder in accordance with the MPEG protocol. The MPEG protocol typically includes a plurality of layers each with respective header information. Nominally each header includes a start code, data related to the respective layer and provisions for adding header information.

There are generally three different encoding formats which may be applied to video data. Intra-frame coding produces an "I" block, designating a block of data where the encoding relies solely on information within a video frame where the macroblock of data is located. Inter-frame coding may produce either a "P" block or a "B" block. A "P" block designates a block of data where the encoding relies on a prediction based upon blocks of information found in a prior video frame. A "B" block is a block of data where the encoding relies on a prediction based upon blocks of data from surrounding video frames, i.e., a prior I or P frame and/or a subsequent P frame of video data.

Digital video data encoded according to MPEG intra-frame coding consist of 8×8 blocks of pels that are subjected to the DCT, producing matrices of Discrete Cosine Coefficients. The DCT is linear transform that maps digital video data associated with pels into frequency coefficients. Each coefficient represents a weighing factor for a corresponding cosine curve. The base cosine curve varies in frequency, with low frequencies describing the block's core structure and high frequencies filling in the detail. Adding the weighted basis curves together reproduces the original pels. By itself, the DCT provides no compression; however, the lack of extreme detail in most image blocks results in most high frequency coefficients being zero, or near zero. The DCT coefficients are subjected to adaptive quantization, and are then run-length and variable-length encoded. Therefore, respective blocks of intra-frame encoded digital video data may include less data than an 8×8 matrix of pels. In addition to the DCT coefficients, macroblocks of intra-frame encoded data include information such as the level of quantization employed, a macroblock address indicator and a macroblock type.

Blocks of data encoded according to inter-frame coding may also consist of matrices of Discrete Cosine Coefficients, and are subjected to adaptive quantization, as well as run-length and variable-length encoding. The coefficients represent, however, differences between an 8×8 pel block from the macroblock being encoded and an 8×8 pel block in a reference frame of digital video data. The predictive coding process involves generating motion vectors indicating the relationship between a macroblock being encoded and a corresponding 16×16 pel region of a reference frame that most closely matches the macroblock being encoded. The pel data of the matched block in the reference frame is subtracted, on a pel-by-pel basis, from the block of the frame being encoded, to develop differences. If no reasonable block matches can be found for a block/macroblock which permits inter-frame encoding, the non-matching block/macroblock is encoded according to intra-frame encoding. The differences computed for a block are processed using the DCT, with the transformed differences and the motion vectors included in the encoded data for the predicted blocks. The macroblocks of the inter-frame encoded frames also include quantization, address and type information.

Compressed video data occurs at differing rates because respective frames require different amounts of compressed data. It is desirable to transmit the compressed data at an approximately constant rate equivalent to a transmission channel's capacity to realize efficient use of the channel. Typically, rate buffers are implemented to perform variable to constant rate translation. An encoder regulates the amount of data provided to the buffers in accordance with buffer occupancy. Therefore, in compressing digital video data a data rate must be determined in addition to the encoding format and quantization level for each macroblock.

There have been prior art attempts to compress/decompress motion picture video data by taking advantage of the aforementioned principles. In U.S. Pat. No. 5,193,004 to Wang et al., an apparatus and method for coding even fields of interlace video sequences is disclosed wherein odd field data is separated from even field data before encoding occurs. The even field data is encoded and subsequently compared with the odd field data to determine if any errors occurred during the coding process.

U.S. Pat. No. 5,144,424 to Savatier discloses an apparatus and method for controlling the quantization of video data. A two step process is employed to determine the quantization level for each macroblock. First, each macroblock is compressed according to intra-frame encoding and coefficients are determined and quantized with a constant value. Then, the number of bits for each sub-block within the macroblock is determined and an average value is taken. The average value determines whether a macroblock is capable of severe quantization without a substantial loss of information.

The problem encountered in the prior art devices is that the determination of the encoding format, the bit rate and the quantization level requires numerous process steps which has previously required a large amount circuitry. What is needed is an apparatus that reduces the number of process steps and circuit complexity while determining the requisite encoding parameters for a macroblock of data corresponding to a motion picture video image.

SUMMARY OF THE INVENTION

This object has been achieved by an encoding conditions selection apparatus adapted for inclusion in an MPEG-II encoder and methods for selecting encoding parameters for a macroblock of video data that comprises a means for receiving and concurrently stratifying digital video data associated with the macroblock into a plurality of blocks. Each block may correspond to differences produced by subtracting digital video data for pels of a reference frame of video from digital video data for pels of the block. Alternatively, each block may correspond to video data for pels of the macroblock. A means for evaluating functions, i.e. either a mean square error or a variance, processes the stratified data for each of the plurality of blocks. A plurality of encoding conditions are determined based upon the block block function evaluations.

These and other features, objects and advantages will be understood or apparent to those of ordinary skill in the art from the following detailed description of the preferred embodiment as illustrated in the various drawing figures.

DETAILED DESCRIPTION OF THE PREFERRED EMBODIMENT

Figure 1:
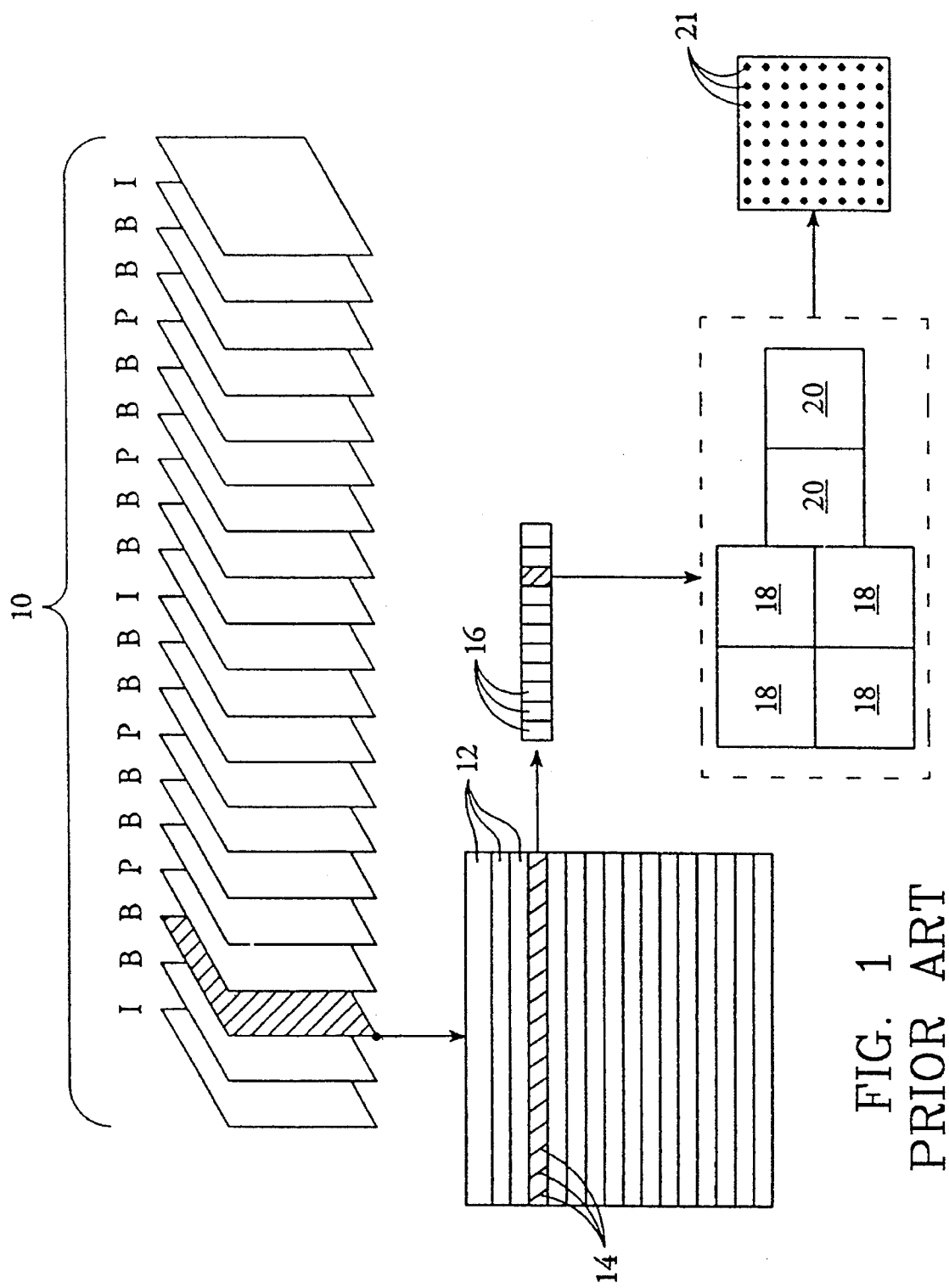
FIG. 1 is a block diagram depicting an illustrative assignment of a plurality of frames of a video image for encoding according to an MPEG protocol, and the relationship between a macroblock of pels and one such frame's digital video data.
Figure 2:
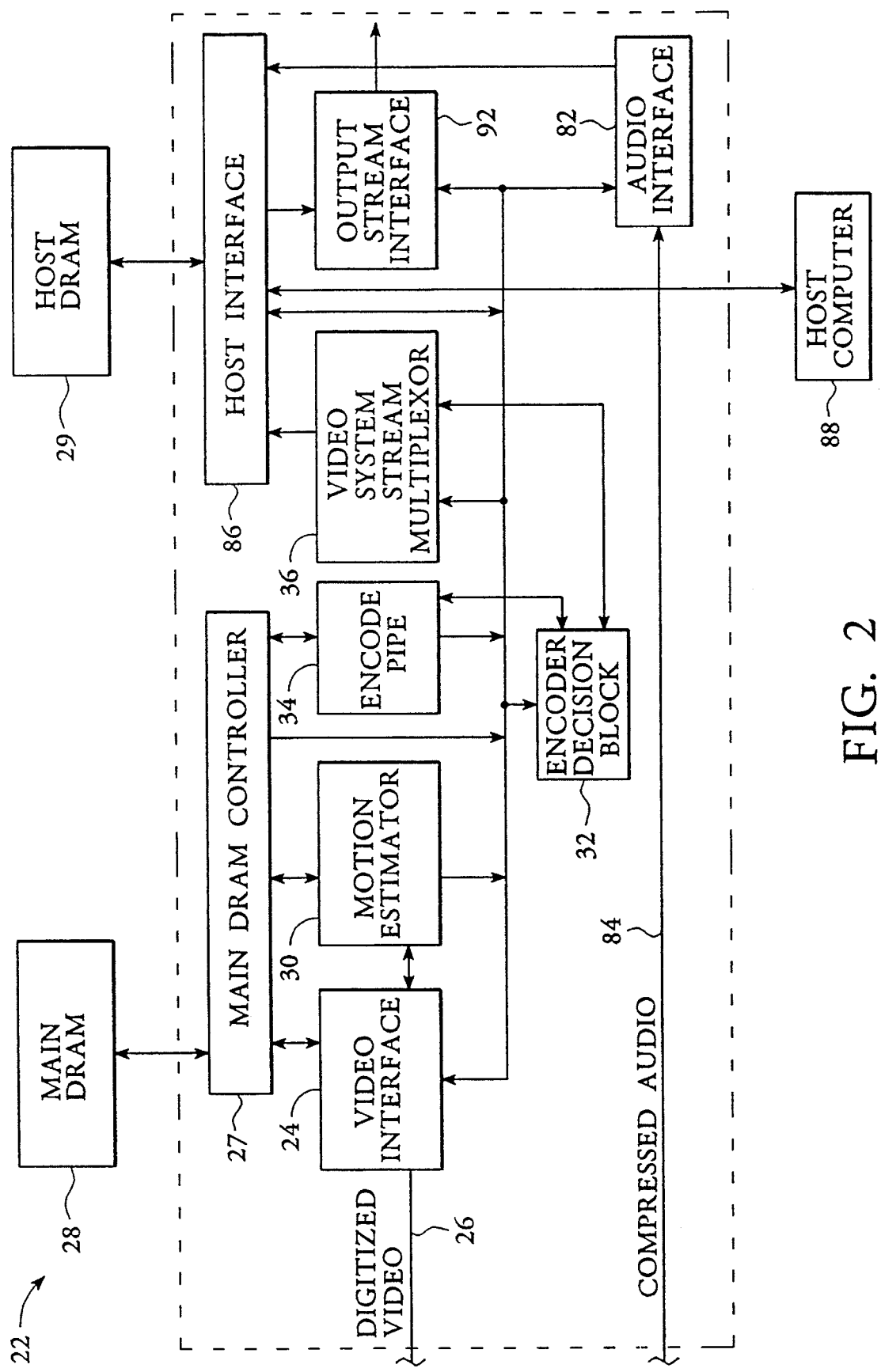
FIG. 2 is a block diagram depicting an apparatus in accord with the present invention for compressing digital video data in accordance with the MPEG protocol illustrated in FIG. 1.

FIG. 2 shows an encoder chip 22 designed to convert raw digitized video data into an MPEG-II compressed video data stream. To that end, the encoder chip 22 includes a video interface 24 that accepts raw digitized video data in most standard formats along a line 26. The video interface 24 may decimate the component coded video data thereby reducing the amount of data present by combining data values for adjacent pels, as well as resolving the data as an N×M matrix of a predetermined number of pels. The data is then transferred from the encoder chip 22 through a main DRAM controller 27 to a dedicated main DRAM 28. In addition, the video interface 24 may filter the digitized video data at the resolution of the video data received by the encoder chip 22 or at the decimation resolution. Also, the encoder chip 22 may filter the data after decimation.

During compression the digital video data making up a frame of digital video data is processes as 16×16 contiguous matrices of pels, each such 16×16 matrix being referred to as a macroblock. A motion estimator 30 is included in the encoder chip 22 to retrieve from the main DRAM 28 digital video data of frames that are to be encoded either as a P or B frame, and to determine the direction and amount of motion between the macroblocks belonging to such frames and one or two reference frames. The motion estimator 30 may make this determination in any manner known in the art. For example, the motion estimator may perform block matching estimation. In this manner, the motion estimator 30 estimates the motion vector for each macroblock in a current frame by searching through a larger search block for a best match. A best match may be determined by a pel-by-pel comparison between the intensity of the pels in the macroblock and the corresponding pels in the search block, producing a Minimum Absolute Error ("MAE"). An example of this method is fully described in U.S. Pat. No 5,200,820 to Gharavi and is incorporated by reference herein. Once a motion vector is determined, it is stored in the host dram 29 via a host interface 86.

An encoder decision block ("EDB") 32 then retrieves the digital video data for a macroblock from the main DRAM 28 together with the corresponding motion vector from host DRAM 29, and process digital video data for the macroblock to determine various encoding conditions that the encoder chip 22 will apply in encoding this macroblock. The EDB 32 decides whether a macroblock is to be intra-frame or inter-frame encoded, as well as determining the quantization for a particular macroblock. The EDB 32 also causes the motion vector to specify a DCT type or translation field for a macroblock, as well as selecting an encoding for the macroblock which should produce a pre-specified rate at which data will be fed through the remaining components of the encoder chip 22. The encode pipe 34 is connected to receive the output from the EDB 32, and actually encodes the macroblocks. The encoding may be performed in accordance with encoding conditions determined by the EDB 32, or alternatively, may be performed in accordance with encoding conditions that are supplied to the encoder chip 22 through a host interface 23. It is the encode pipe 34 that will compute the DCT, quantize the coefficients and perform VLC. The encode pipe 34 compresses the digitized video by subdividing successive macroblocks of digital video data into 8×8 blocks and processing the 8×8 blocks. Each 8×8 block is compressed by computing DCT coefficients, and then the coefficients are individually quantized to compress the data. The compressed data is then coded efficiently into an MPEG-II video stream using VLC, or Huffman coding. Encoded video data is stored in the host DRAM 29 with residual video data being stored in main DRAM 28.

The encoder chip 22 includes an audio interface 82 which accepts, via a line 84, digital audio data compressed in accordance with the MPEG-II protocol. After receiving MPRG-II compressed digital audio data, the audio interface 82 transmits such data through the host interface 86 to the host dram 29.

A video system stream multiplexer 36 is provided in the encoder chip 22 which assembles the MPEG-II compressed video and audio data extracted from the host DRAM 29 into an MPEG-II system stream suitable for transmission to an MPEG decoder. The MPEG-II system stream is made up of transport packets each one of which generally includes a header, indicating the type of information included in the respective transport packet, as well as compressed video or audio data and additional information about the compressed video data. After the video system stream multiplexer 36 assembles the compressed video and audio data into a system stream, it stores the assembled MPEG-II system stream data back into the host dram 29.

The MPEG-II system stream present in the host dram 29 may be transferred in parallel from the host dram 29 through the host interface 86 to a host computer 88 for further processing. Alternatively, in applications for the encoder chip 22 which require transmission of a serial bitstream, an output stream interface 92 fetches the MPEG-II system stream data in parallel from the host dram 29, converts the data into a serial bitstream, and transmits the serial bitstream from the encoder chip 22.

Figure 3:
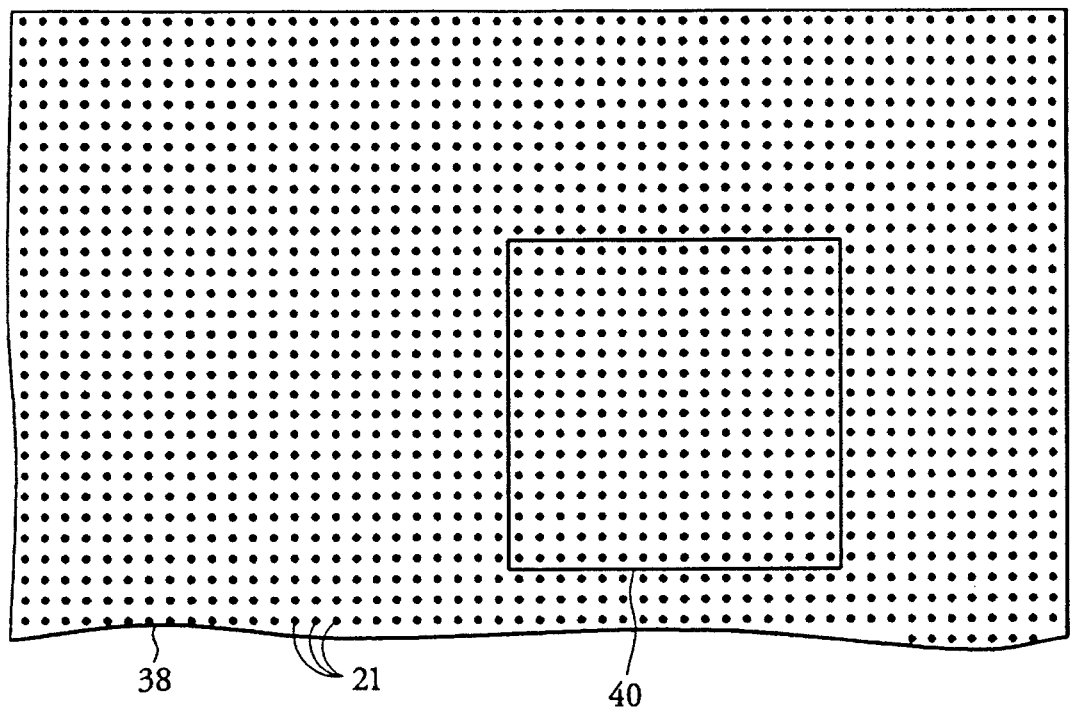
FIG. 3 shows a matrix of pels corresponding to a search area of reference digital video data, with a 16×16 search block depicted in the matrix of pels.

Referring also to FIG. 3, to determine the encoding conditions for a macroblock, the EDB 32 must perform a large number of computations to calculate block variances, also referred to as an inter-variance, and block mean square errors. As described in greater detail below, evaluating block mean square error functions requires computing a difference between the luminance value of a pel in the macroblock and the luminance value of a corresponding pel in a search area of a video image corresponding to a 64×64 matrix 38 of pels. The difference is determined between a search block 40, a 16×16 matrix of pels in the 64×64 matrix 38 having an MAE with respect to the macroblock, and the macroblock.

Figure 4:
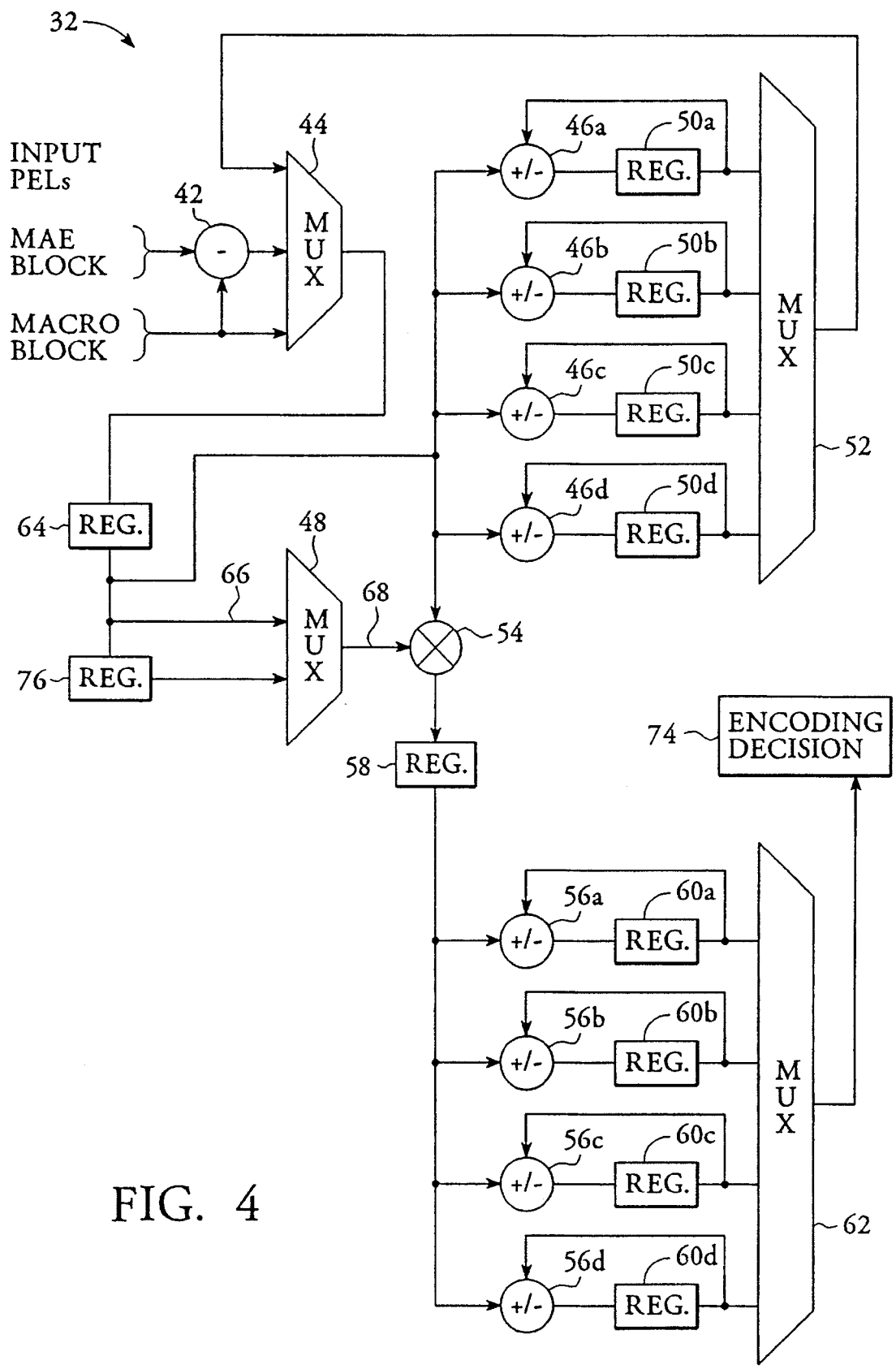
FIG. 4 is a data flow diagram depicting an encoding decision block, shown in FIG. 2, in accordance with the present invention.

FIG. 4 shows the EDB 32 used to perform the computationally intensive operations for determining the various encoding conditions of a macroblock. The EDB 32 includes an entrance adder 42 for computing differences between digital video data associated with macroblock pels. Entrance adder 42 determines the difference between the pels of the search block 40 and macroblock for which encoding conditions are being determined. The entrance adder 42 is in electrical communication with the input of an entrance multiplexer 44. The inputs of a plurality of summing adders 46a–d are connected in parallel and are in electrical communication with the output of the entrance multiplexer 44. An input of a shifting multiplexer 48 is also in electrical communication with the output of the entrance multiplexer 44. Uniquely associated with each summing adder 46a–d is one of a plurality of summing registers 50a–d. The output of each summing register 50a–d is in electrical communication with an exit multiplexer 52. The output of the shifting multiplexer 48 is in electrical communication with the input of a multiplier 54. The inputs of a plurality of squared adders 56a–d are connected in parallel to the output of the multiplier 54 via a register 58. Uniquely associated with the output of each squared adder 56a–d is the input of a squared register 60a–d. The output of squared registers 60a–d is in electrical communication with the input of an output multiplexer 62.

The entrance multiplexer 44 operates to select a source of digital video data either directly from the macroblock or from differences determined by the entrance adder 42, or to select intermediate computational results from the exit multiplexer 52. If the entrance multiplexer 44 selects intensity digital video data directly from the macroblock, the EDB 32 computes variances used in encoder chip bit rate control, and in determining how the macroblock is to be encoded. Alternatively, if the entrance multiplexer 44 selects a difference in intensity digital video data produced by the entrance adder 42, then the EDB 32 computes mean square errors used in DCT type decision and motion decisions. The entrance multiplexer 44 selects intermediate computational results from the exit multiplexer 52 only after digital video data for all the pels for a specified block have passed through the entrance multiplexer 44. After the entrance multiplexer 44 selects one of these three types of data, such data passes to a register 64 which holds the data temporarily while the EDB 32 concurrently stratifies the data and performs specified computations using that data.

Concurrent Evaluation of Stratified Variances

While the register 64 holds intensity digital video data directly from a macroblock, the summing adder 46a accumulates such digital video data for an 8×8 pel block by adding such data to the value held in the summing register 50a, and storing the result of such addition back into the summing register 50a. Concurrently, the summing adder 46d accumulates such digital video data for a 16×16 pel block by adding such data to the value held in the summing register 50d, and storing the result of such addition back into the summing register 50d. Furthermore, if the digital video data held by the register 64 is associated with a pel having an even row coordinate, then the summing adder 46c concurrently accumulates digital video data for an 8×8 pel even-field block by adding such data to the value held in the summing register 50c, and storing the result of such addition back into summing register 50c. Conversely, if the digital video data held by the register 64 is associated with a pel having an odd row coordinate, then the summing adder 46b concurrently accumulates digital video data for an 8×8 pel odd-field block by adding such data to the value held in the summing register 50c, and storing the result of such addition back into summing register 50c. In this way the EDB 32 concurrently stratifies sums of the digital video data into summed values respectively for an 8×8 pel block, for a 16×16 pel block, for an 8×8 pel even-field block, and for an 8×8 pel odd-field block.

Moreover, while the register 64 holds digital video data directly from a macroblock, the shifting multiplexer 48 receives the digital video data from the register 64 via a line 66 to thereby supply the digital video data present in the register 64 to one input of the multiplier 54 via a line 68. Concurrently, another input of the multiplier 54 receives the digital video data present in the register 64 directly from the register 64. Consequently, receiving the digital video data at both of the inputs, the multiplier 54 squares the value of the digital video data present in the register 64 and supplies the squared value of the digital video data to the register 58. While the register 58 holds the squared value of the digital video data present in the register 64, the adder 56a accumulates such squared value for an 8×8 pel block by adding the squared value to the value held in the squared register 60a, and storing the result of such addition back into the squared register 60a. Concurrently, the adder 56d accumulates such squared value for a 16×16 pel block by adding such value to the value held in the squared register 60d, and storing the result of such addition back into the squared register 60d. Furthermore, if the squared value held by the register 64 is associated with a pel having an even row coordinate, then the adder 56c concurrently accumulates squared value for an 8×8 pel even-field block by adding such value to the value held in the squared register 60c, and storing the result of such addition back into squared register 60c. Conversely, if the squared value held by the register 64 is associated with a pel having an odd row coordinate, then the adder 56b concurrently accumulates squared value for an 8×8 pel odd-field block by adding such value to the value held in the squared register 60c, and storing the result of such addition back into squared register 60c. In this way the EDB 32 concurrently stratifies sums of the squared value into summed squared values respectively for an 8×8 pel block, for a 16×16 pel block, for an 8×8 pel even-field block, and for an 8×8 pel odd-field block.

In accumulating the stratified summed values and summed squared values for the macroblock, the EDB 32 processes the 16×16 macroblock as two parallel 8×16 columns, i.e. a left-hand 8×16 column and a right-hand 8×16 column. Moreover, after processing the top 8 rows of the left-hand 8×16 column, the EDB 32 has completely accumulated the summed value in the summing register 50a for an 8×8 pel block located in the top-half of the left hand column, and has concurrently completely accumulated the summed squared value for the same 8×8 pel block in the squared register 60a. Accordingly at this point in processing the macroblock the EDB 32 momentarily pauses the processing of digital video data directly from the macroblock and instead uses the exit multiplexer 52 and the entrance multiplexer 44 to transfer the summed value from the summing register 50a to the register 64. While the register 64 holds the summed value for the 8×8 pel block located in the top-half of the left-hand column, the shifting multiplexer 48 supplies the summed value present in the register 64 to one input of the multiplier 54 while another input of the multiplier 54 receives the summed value present in the register 64 directly from the register 64. Consequently, receiving the summed value at both of the inputs, the multiplier 54 squares the summed value present in the register 64 and supplies the squared summed value to the register 58. While the register 58 holds the squared summed value, the adder 56a subtracts such squared summed value for the 8×8 pel block from the summed squared value held in the register 60a for the same 8×8 pel block thereby performing a variance block functional evaluation for the 8×8 pel block located in the top-half of the left-hand column, and stores the variance thus evaluated back into the register 60a. Upon thus evaluating the 8×8 pel block variance, the output multiplexer 62 transfers the 8×8 block variance from the register 60a to the encoding decision circuit 74 which processes the 8×8 pel block variance to determine the minimum 8×8 pel block variance which occurs in the entire macroblock.

After evaluating the 8×8 pel block variance, the EDB 32 resumes its prior mode of operation in processing digital video data directly from the macroblock. In resuming its prior operating mode, the EDB 32 commences stratifying and accumulating both summed values and summed squared values for a new 8×8 block located in the bottom-half of the left-hand column of the macroblock, and resumes stratifying and accumulating s and summed squared values for the 8×8 pel even-field block, for the 8×8 pel odd-field block, and for the 16×16 pel block.

After processing the bottom 8 rows of the left-hand 8×16 column, the EDB 32 has completely accumulated a block's summed values in each of the summing registers 50a, 50b and 50c, and a block's summed squared values in each of the squared registers 60a, 60b and 60c. The summed values and the summed squared values thus accumulated are those for a second 8×8 pel block located in the bottom-half of the left hand column of the macroblock, and for both the 8×8 even-field block and the 8×8 odd-field block of the left-hand column. Accordingly, at this point in processing the macroblock the EDB 32 again momentarily pauses the processing of digital video data directly from the macroblock and instead uses the exit multiplexer 52 and the entrance multiplexer 44 to successively transfer the summed values from the summing registers 50a, 50b and 50c to the register 64. While the register 64 holds each successive summed value, the shifting multiplexer 48 supplies the summed value present in the register 64 to one input of the multiplier 54 while another input of the multiplier 54 receives the summed value present in the register 64 directly from the register 64. Consequently, receiving the summed value at both of the inputs, the multiplier 54 successively squares each summed value and supplies the squared summed value to the register 58. While the register 58 holds the successive squared summed values, the squared adders 56a, 56b and 56c respectively subtract each successive squared summed value from the summed squared value respectively held in the squared registers 60a, 60b, and 60c thereby successively performing variance block functional evaluations for the 8×8 pel block located in the bottom-half of the left-hand column of the macroblock, and for both the 8×8 pel even-field and 8×8 pel odd-field blocks in the left hand column. The EDB 32 successively stores these variances respectively into the squared registers 60a, 60b and 60c. The output multiplexer 62 then successively transfers the variances present in the squared registers 60a, 60b and 60c respectively to the encoding decision circuit 74 which determines the minimum 8×8 pel block variances respectively for the 8×8 pel block, for the 8×8 pel even-field block, and for the 8×8 pel odd-field block.

After thus evaluating all 8×8 pel block variances for the left-hand column of the macroblock, the EDB 32 resumes its prior mode of operation in processing digital video data directly from the right-hand column of the macroblock. Accordingly, after processing the top-half of the right-hand column the EDB 32 evaluates a third 8×8 pel block variance which the output multiplexer 62 then transfers to the encoding decision circuit 74 for use in determining the minimum 8×8 pel block variance. Similarly, upon completing processing of the bottom-half of the right-hand column, an evaluation of a fourth 8×8 pel block variance is present in the register 60*a*, a second 8×8 pel even-field block variance is present in the register 60*b*, a second 8×8 pel odd-field block variance is present in the register 60*c*, and a 16×16 pel block variance is present in the register 60*d*. In this way the EDB 32 receives digital video data associated with all the pels of the macroblock and concurrently stratifies the received digital video data into a plurality of blocks. Furthermore, using the stratified digital video data the EDB 32 also performs block function evaluations of variances for each block in the plurality of blocks. As the EDB 32 completes each block function evaluation, e.g. the variances such as the four block variances present in the squared registers 60*a*–60*d* at the conclusion of processing the macroblock, the output multiplexer 62 successively transfers them to the encoding decision circuit 74 for use in determining encoding conditions for the macroblock.

Concurrent Evaluation of Stratified Mean Square Errors

While the register 64 holds a difference in intensity digital video data produced by the entrance adder 42, the summing adder 46*a* accumulates such difference for a 16×16 pel block by adding such data to the value held in the summing register 50*a*, and storing the result of such addition back into the summing register 50*a*. Furthermore, if the difference held by the register 64 is associated with a pel having an even row coordinate, then the summing adder 46*c* concurrently accumulates differences for an 8×16 pel even-field block by adding such data to the value held in the summing register 50*c*, and storing the result of such addition back into summing register 50*c*. Conversely, if the difference held by the register 64 is associated with a pel having an odd row coordinate, then the summing adder 46*b* concurrently accumulates differences for an 8×16 pel odd-field block by adding such data to the value held in the summing register 50*c*, and storing the result of such addition back into summing register 50*c*. In this way the EDB 32 concurrently stratifies sums of the differences into summed values respectively for a 16×16 pel block, for an 8×16 pel even-field block, and for an 8×16 pel odd-field block.

Moreover, while the register 64 holds a difference produced by the entrance adder 42, the shifting multiplexer 48 concurrently supplies the difference present in the register 64 to one input of the multiplier 54 while another input of the multiplier 54 receives the difference present in the register 64 directly from the register 64. Consequently, receiving the difference at both of the inputs, the multiplier 54 squares the value of the difference present in the register 64 and supplies the squared value of the difference to the register 58. While the register 58 holds the squared value of the difference present in the register 64, the adder 56*a* accumulates such squared value for a 16×16 pel block by adding the squared value to the value held in the register 60*a*, and storing the result of such addition back into the register 60*a*. Furthermore, if the squared value held by the register 64 is associated with a pel having an even row coordinate, then the adder 56*c* concurrently accumulates the squared value for an 8×8 pel even-field block by adding such value to the value held in the register 60*c*, and storing the result of such addition back into register 60*c*. Conversely, if the squared value held by the register 64 is associated with a pel having an odd row coordinate, then the adder 56*b* concurrently accumulates the squared value for an 8×8 pel odd-field block by adding such value to the value held in the register 60*c*, and storing the result of such addition back into register 60*c*. In this way the EDB 32 concurrently stratifies sums of the squared value of the differences into summed squared values respectively for a 16×16 pel block, for an 8×16 pel even-field block, and for an 8×16 pel odd-field block.

The intensity digital video data supplied to the inputs of the entrance adder 42 and the differences produced thereby alternate between those associated with pels of the macroblock having odd row coordinates and the pel located immediately beneath such pels, i.e. pels having even row coordinates. To accumulate sums used in evaluating a cross-product mean square error for differences in intensity digital video data associated with pels having odd row coordinates and pels having even row coordinates, if the register 64 holds a difference for an odd row pel, that difference is transferred to and held by a cross-product register 76. Subsequently, after the EDB 32 has accumulated the summed squared value for the immediately following difference in digital video data associated with a pel having an even row coordinate storing the results of the accumulation respectively in the squared registers 60*a* and 60*c*, the EDB 32 momentarily pauses the processing of digital video data while the shifting multiplexer 48 supplies the difference in intensity digital video data present in the cross-product register 76, that is associated with the pel having an odd row coordinate, to one input of the multiplier 54. Concurrently, the register 64 supplies the difference in intensity digital video data associated with the pel having an even row coordinate to the other input of the multiplier 54. Consequently, receiving the difference for an odd row coordinate pel at one input and the difference for an even row coordinate pel at the other input, the multiplier 54 computes a cross-product of the differences and supplies the cross-product to the register 58. While the register 58 holds the cross-product, the adder 56*d* accumulates such cross-product for an 8×16 pel block by adding the cross-product to the value held in the register 60*d*, and storing the result of such addition back into the register 60*d*.

After the EDB 32 processes differences in intensity digital video data for all the pels in the macroblock, the EDB 32 uses the exit multiplexer 52 and the entrance multiplexer 44 to successively transfer the summed values from the summing registers 50*a*, 50*b* and 50*c* to the register 64. While the register 64 holds each successive summed value, the shifting multiplexer 48 supplies the summed value present in the register 64 to one input of the multiplier 54 while another input of the multiplier 54 receives the summed value present in the register 64 directly from the register 64. Consequently, receiving the summed value at both of the inputs, the multiplier 54 successively squares each summed value and supplies a squared summed value to the register 58. While the register 58 holds the successive squared summed values, the squared adders 56*a*, 56*b* and 56*c* respectively subtract each successive squared summed value from the summed squared value respectively held in the squared registers 60*a*, 60*b*, and 60*c* thereby successively performing mean square error block functional evaluations for the 16×16 pel block, for the 8×16 pel even-field block, and for the 8×16 pel odd-field block. The EDB 32 successively stores these mean square errors respectively into the squared registers 60a, 60b and 60c.

While the register 64 holds the summed value for the odd-field block, in addition to being transferred by the shifting multiplexer 48 to one input of the multiplier 54, the summed value for the odd-field block is also loaded into the cross-product register 76. After the summed value for the even-field block has been loaded into the register 64 and squared by the multiplier 54, the shifting multiplexer 48 then supplies the summed value for the odd-field block present in the cross-product register 76 to the input of the multiplier 54. Simultaneously, the other input of the multiplier 54 receives the summed value for the even-field block directly from the register 64. The multiplier 54 then multiplies together these two summed values for the odd-field and even-field blocks thereby forming a sums cross-product which is then loaded into the register 58. After the sums cross-product is present in the register 58, the adder 56d subtracts the sums cross-product from the cross-products sum present in the register 60d to evaluate a cross-product mean square error for an 8×16 block which is then stored back into the register 60d.

In this way the EDB 32 receives differences between digital video data associated with all the pels of the macroblock and concurrently stratifies the received differences into a plurality of blocks. Furthermore, using the stratified differences the EDB 32 also performs block function mean square error evaluations for each block in the plurality of blocks. As the four block functions mean square error evaluations become present in the squared registers 60a–60d, the output multiplexer 62 transfers them to the encoding decision circuit 74 which determines encoding conditions for the macroblock.

Determining Encoding Conditions

As outlined above, variances determined for nine blocks are used by the encoding decision circuit 74 to determine encoding conditions which increase the number of zero coefficients computed for the DCT and reduce the number of bits needed for non-zero coefficients in encoding a macroblock. The intra-variances are also used in conjunction with the mean square errors to establish the encoding format, as well as the bit rate for the encoder chip. Expressed mathematically, the nine intra-variances are determined as follows:

$8 \times 8$ Intra-Variance $= \Sigma(Y_{m,n})^2 - (\Sigma(Y_{m,n}))^2$    $m = 1$ to 8 by 1
$n = 1$ to 8 by 1

$8 \times 8$ Intra-Variance $= \Sigma(Y_{m,n})^2 - (\Sigma(Y_{m,n}))^2$    $m = 9$ to 16 by 1
$n = 1$ to 8 by 1

$8 \times 8$ Intra-Variance $= \Sigma(Y_{m,n})^2 - (\Sigma(Y_{m,n}))^2$    $m = 1$ to 8 by 1
$n = 9$ to 16 by 1

$8 \times 8$ Intra-Variance $= \Sigma(Y_{m,n})^2 - (\Sigma(Y_{m,n}))^2$    $m = 9$ to 16 by 1
$n = 9$ to 16 by 1

$8 \times 8$ Intra-Variance $= \Sigma(Y_{m,n})^2 - (\Sigma(Y_{m,n}))^2$    $m = 1$ to 15 by 2
$n = 1$ to 8 by 1

$8 \times 8$ Intra-Variance $= \Sigma(Y_{m,n})^2 - (\Sigma(Y_{m,n}))^2$    $m = 2$ to 16 by 2
$n = 1$ to 8 by 1

$8 \times 8$ Intra-Variance $= \Sigma(Y_{m,n})^2 - (\Sigma(Y_{m,n}))^2$    $m = 1$ to 15 by 2
$n = 9$ to 16 by 1

$8 \times 8$ Intra-Variance $= \Sigma(Y_{m,n})^2 - (\Sigma(Y_{m,n}))^2$    $m = 2$ to 16 by 2
$n = 9$ to 16 by 1

$16 \times 16$ Intra-Variance $= \Sigma(Y_{m,n})^2 - (\Sigma(Y_{m,n}))^2$    $m = 1$ to 16 by 1
$n - 1$ to 16 by 1

Figure 5:
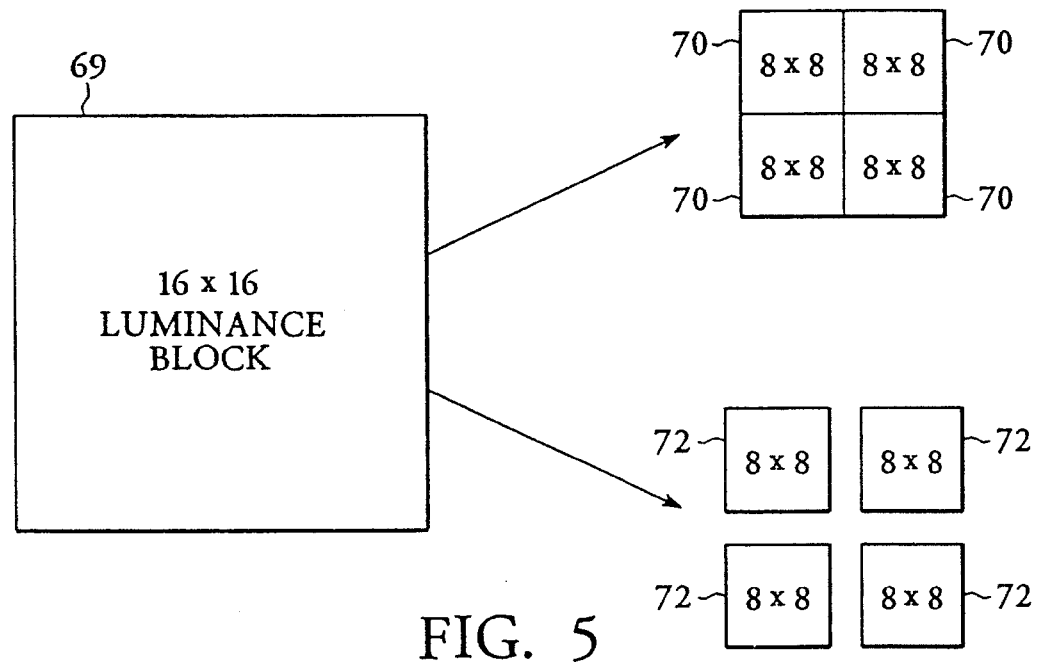
FIG. 5 is a block diagram illustrating the stratification of digital video data into a plurality of blocks in accordance with the present invention.

Referring also to FIG. 5 and as described above, the intensity digital video data value for each pel in the macroblock is stratified, concurrently, into a plurality of blocks. In addition to a 16×16 macroblock 69, the plurality of blocks formed correspond to various 8×8 blocks of pels. Each of the 8×8 blocks is associated with a plurality of intensity values corresponding to a predetermined set of coordinates of the 16×16 macroblock 69. Four of 8×8 blocks 70 are associated with intensity values corresponding consecutive coordinates. For example, there is one 8×8 block associated with intensity values having each of the following sets of coordinates:

$m=1$ to 8 by 1, $n=1$ to 8 by 1;
$m=9$ to 16 by 1, $n=1$ to 8 by 1;
$m=1$ to 8 by 1, $n=9$ to 16 by 1;
$m=9$ to 16 by 1, $n=9$ to 16 by 1.

In addition, four of 8×8 blocks 72 are associated with non-consecutive, e.g. alternating, coordinates. The blocks associated with alternating coordinates are as follows:

odd blocks
$m=1$ to 15 by 2, $n=1$ to 8 by 1;
$m=9$ to 15 by 2, $n=9$ to 16 by 1;
even blocks
$m=2$ to 16 by 2, $n=1$ to 8 by 1;
$m=2$ to 16 by 2, $n=9$ to 16 by 1.

As the intensity digital video data values are stratified, they are summed and their squares are summed, and the resulting sums are used in calculating the variances as described above. While the EDB 32 processes each macroblock, the minimum values for three intra-variances are detected and temporarily preserved in the encoding decision circuit 74. One minimum intra-variance is that for the 8×8 blocks associated with pels having consecutive coordinates. Another minimum intra-variance is that for the 8×8 blocks of pels having even-field coordinates. The final minimum intra-variance is that for the 8×8 blocks of pels having odd-field coordinates.

An activity level for each of the aforementioned 8×8 blocks is determined by introducing the three minimum variances into the following calculation:

$$act_j = 1 + \min(var\_sblk)$$

where $act_j$ is the activity level for the macroblock and $\min(var\_sblk)$ is the minimum value of an 8×8 block.

The activity level $act_j$ having the least calculated value is the normalized in the following manner:

$$N\_act_j = \frac{2(act_j + avg_{act})}{(act_j 2)(avg_{act})}$$

where $avg_{act}$ is the average value of the most recent macroblock to be encoded.

From the normalized activity level, the bit rate through the encoder chip is controlled by fixing the macroblock's quantization levels as follows:

$$mquant = Q_j \, N\_act_j$$

where $Q_j$ is a reference quantization determined from the fullness of an appropriate virtual buffer.

The level of quantization is used to define a quantizer which is divided into each coefficient to reduce the number of bits needed for non-zero frequencies. Because the eye is less sensitive to errors in high frequency coefficients, the quantizer values tend to increase with frequency. Quantizing causes a loss of image content. Larger quantizer values cause more loss, but also deliver higher compression. As such, the quantization is typically used to establish the data bit rate.

The encoding format is determined by comparing the intra-variance value of the 16×16 macroblock to the mean square error values for the same 16×16 macroblock. If the 16×16 pel mean square error value is greater than both the intra-variance value and 23000, then the macroblock is to be intra-frame encoded. If the 16×16 pel mean square error value does not meet both of the aforementioned conditions, then inter-frame encoding may be employed.

As described above, the 16×16 pel mean square error is determined between the search block 40, i.e. a 16×16 matrix of pels in the search area's 64×64 matrix 38 having an MAE with respect to the macroblock, and the macroblock. Corresponding pels are defined as pels located at the corresponding locations in different macroblocks. The 16×16 MSE that is calculated for pels associated with the macroblock is defined mathematically as follows:

$$MSE_{16\times16} = \Sigma(MAE-MB)^2_{16\times16} - (\Sigma(MAE-MB)_{16\times16})^2$$

where MAE corresponds to the Minimum Absolute Error search block 40 and MB corresponds to the macroblock.

The 16×16 subscript denotes that the above-identified computation is performed for every pel in the macroblock. In this manner, the EDB 32 evaluates the 16×16 pel mean square variance which is used in determining whether the macroblock is to be encoded according to inter-frame or intra-frame encoding, as discussed above.

The following is an example of the above-identified computation. Assume the search block 40 and the macroblock MB are defined as follows:

$$MAE = \begin{vmatrix} a_{11} & a_{12} & a_{13} & \ldots & a_{1n} \\ a_{21} & a_{22} & a_{23} & \ldots & a_{2n} \\ a_{31} & a_{32} & a_{33} & \ldots & a_{3n} \\ \cdot & \cdot & \cdot & & \\ \cdot & \cdot & \cdot & & \\ \cdot & \cdot & \cdot & & \\ a_{M1} & a_{M2} & a_{M3} & \ldots & a_{Mn} \end{vmatrix}$$

$$MB = \begin{vmatrix} b_{11} & b_{12} & b_{13} & \ldots & b_{1n} \\ b_{21} & b_{22} & b_{23} & \ldots & b_{2n} \\ b_{31} & b_{32} & b_{33} & \ldots & b_{3n} \\ \cdot & \cdot & \cdot & & \\ \cdot & \cdot & \cdot & & \\ \cdot & \cdot & \cdot & & \\ b_{M1} & b_{M2} & b_{M3} & \ldots & b_{Mn} \end{vmatrix}$$

As can be seen, each pel corresponds to a coordinate that is positioned among an array of coordinates arranged in vertical columns and horizontal rows with the coordinate defined by an intersection of a vertical column with a horizontal row. For example, the search block pel corresponding to the coordinate defined by the intersection of the first vertical column with the first horizontal row is $a_{11}$. The corresponding MB pel is $b_{11}$. The difference between the two pels is $a_{11}-b_{11}$. Therefore, $MSE_{16\times16} = \Sigma(MAE-MB)^2_{16\times16} - (\Sigma(MAE-MB)_{16\times16})^2$ when expanded is expressed mathematically as follows:

$$(a_{11}-b_{11})^2 + \ldots + (a_{1n}-b_{1n})^2 - [(a_{11}-b_{11}) + \ldots + (a_{1n}-b_{1n})]^2 +$$
$$(a_{21}-b_{21})^2 + \ldots + (a_{2n}-b_{2n})^2 - [(a_{21}-b_{21}) + \ldots + (a_{2n}-b_{2n})]^2 +$$
$$\cdot \quad \cdot \quad \cdot \quad \cdot$$
$$\cdot \quad \cdot \quad \cdot \quad \cdot$$
$$\cdot \quad \cdot \quad \cdot \quad \cdot$$
$$(a_{m1}-b_{m1})^2 + \ldots + (a_{mn}-b_{mn})^2 - [(a_{m1}-b_{m1}) + \ldots + (a_{mn}-b_{mn})]^2$$

As also described above, MSEs are evaluated for pels positioned at coordinates corresponding to odd-fields and even-fields. In this manner, the EDB 32 concurrently obtains variances to determine whether a macroblock should be inter or intra-frame encoded, as well as the type of DCT to be applied. The competing factors in determining a DCT type are obtaining the most possible zero coefficients while maintaining the highest possible image quality. To determine the type of DCT to apply to the macroblock, the EDB 32 computes the following mean square errors:

$$MSE_{odd\ field} = \Sigma(MAE-MB)^2_{odd\ field} - (\Sigma(MAE-MB)_{odd\ field})^2$$

$$MSE_{even\ field} = \Sigma(MAE-MB)^2_{even\ field} - (\Sigma(MAE-MB)_{even\ field})^2.$$

The $MSE_{even\ field}$ and the $MSE_{odd\ field}$ are then used in computing $$d = (MSE_{even\ field}/128)(MSE_{odd\ field}/128).$$

If $d \leq 0.0$, then the macroblock is encoded using a field type DCT. If $d > 0$, then the $MSE_{cross-product}$, expressed mathematically below, $$MSE_{cross-product} = \Sigma((MAE-MB)_{odd\ field} \times (MAE-MB)_{even\ field}) - (\Sigma(MAE-MB)_{odd\ field} \times \Sigma(MAE-MB)_{even\ field}),$$

determines whether the DCT is to be applied collectively to the entire macroblock of digital video data, or to be applied individually to the odd and even fields making up the macroblock of digital video data. If $$\frac{MSE_{cross-product}}{\sqrt{d}} \geq 0.5$$

then the entire macroblock of digital video data is encoded using the DCT. Conversely, if $$\frac{MSE_{cross-product}}{\sqrt{d}} < 0.5$$

then the DCT is applied separately to each field of the macroblock.

In assigning encoding conditions as described above, the encoding decision circuit 74 uses a variety of conventional digital computing elements that are well known in the art. For example the encoding decision circuit 74 uses comparators and registers to determine and preserve the minimum 8×8 intra-variance, the minimum 8×8 odd-field variance, and the minimum 8×8 even field variance. Analogously, a comparator and register is used in testing the 16×16 pel variance and the 16×16 pel mean square error to determine whether the macroblock is to be encoded as an intra-block or as an inter-block. Conversely, a programmable serial by bit arithmetic-logical unit ("ALU") is used in determining the activity level and in normalizing the activity level, in establishing a bit rate for the compressed digital video data by determining mquant, and in establishing an encoding format by determining whether the DCT is to be evaluated for the entire macroblock of digital video data collectively, or individually for each field making up the macroblock. While hardware circuits such as those identifed above are preferred for determining encoding conditions, a general purpose programmable computational device could be used instead because, after intra-variances and mean square errors have been evaluated, determining encoding conditions requires a comparatively insignificant amount of data analysis and computation.

The EDB 32 efficiently and concurrently evaluates a number of different functions because by stratifying digital video data into blocks, rather than repeating the same processing operation in separately in evaluating each of the several functions, the EDB 32 performs only once each of the processing operations needed for evaluating several different functions. For example, in computing four different mean square errors the EDB 32 subtracts the digital video data associated with a reference block pel from the digital video data associated with the corresponding macroblock pel only once rather than three, or perhaps even seven, times. Similarly, the EDB 32 uses each difference thus computed three times in accumulating the summed values and four times in accumulating the summed squared values. Similar efficiencies are also obtained in computing the intra-variances.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. In a digital video data compression scheme, a method for determining a plurality of encoding conditions for a macroblock of digital video data belonging to a frame of digital video data in one of a sequence of frames of motion video data having an initial frame and at least one subsequent frame, the macroblock consisting of digital video data for a plurality of pels located in a region of the frame of digital video data that is smaller than an entire frame, the method for determining the encoding conditions comprising the steps of:

choosing the macroblock for which the encoding conditions are to be determined;

producing a plurality of differences by subtracting the digital video data for a first pel of a plurality of pairs of pels from the digital video data for a second pel of the plurality of pairs of pels, each of the pels corresponding to a coordinate positioned within an array of coordinates arranged in vertical columns and horizontal rows with the coordinate being defined by an intersection of a vertical column with a horizontal row, the digital video data for one of the pels in each pair of pels belonging to the macroblock;

concurrently stratifying the plurality of differences into a plurality of blocks, each block of differences corresponding to a preestablished set of pels belonging to the macroblock;

calculating, for each of the plurality of blocks, a block mean squared error based upon the block of differences associated therewith;

assigning digital video data encoding conditions to the macroblock, each encoding condition being assigned in accordance with preestablished ranges for the calculated block mean squared errors; and compressing the macroblock of digital video data in accordance with the assigned encoding conditions.

2. The method of claim 1 wherein the plurality of differences are produced by subtracting intensity digital video data of pels in the macroblock from intensity digital video data of pels belonging to a different search frame of digital video data.

3. The method of claim 2 wherein one of the plurality of blocks is stratified for a plurality of differences between pels having consecutive coordinates in the macroblock, and at least one of said blocks is stratified for a plurality of differences between pels having non-consecutive coordinates in the macroblock.

4. The method of claim 2 wherein the calculating step includes the steps of:

summing the difference for each block upon producing each such difference thereby incrementally accumulating a summed value for each block;

squaring each difference upon producing each such difference thereby determining a squared value;

summing the squared value for each block upon determining each squared value thereby incrementally accumulating a summed squared value for each block, after accumulating, for all the pels in the macroblock, the summed value for each block, squaring the summed value accumulated for each block thereby determining a squared summed value for each block; and upon determining the squared summed value for each block, calculating the block mean squared error for each block by subtracting the squared summed value for the block from the summed squared value for the block.

5. The method of claim 3 wherein blocks stratified for non-consecutive coordinates in the macroblock include both a block stratified for even numbered rows thereby defining an even-field block, and a block stratified for odd numbered rows thereby defining an odd-field block.

6. The method of claim 4 wherein the steps of:

summing the difference for each block includes concurrently summing differences for pels having consecutive coordinates while summing differences for pels having non-consecutive coordinates; and summing the squared value includes concurrently summing squared values for pels having consecutive coordinates while summing squared values for pels having non-consecutive coordinates.

7. The method of claim 5 further comprising the steps of:

computing a plurality of cross-products by multiplying each difference for the even-field block with the corresponding difference for the odd-field block;

summing the plurality of cross-products to determine a cross-products sum;

summing the differences for the even-field block thereby determining an even-field block sum;

summing the differences for the odd-field block thereby determining an odd-field block sum;

multiplying the even-field block sum by the odd-field block sum thereby determining a block sum cross-product; and subtracting the block sum cross-product from the cross-products sum thereby determining a cross-product mean square error.

8. In a digital video data compression scheme, a method for determining a plurality of encoding conditions for a macroblock of digital video data belonging to a frame of digital video data, the macroblock consisting of digital video data for a plurality of pels located in a region of the frame of digital video data that is smaller than an entire frame, the method for determining the encoding conditions comprising the steps of:

choosing the macroblock for which the encoding conditions are to be determined;

accumulating intensity values for the video data of each pel in the macroblock, each of the pels corresponding to a coordinate positioned within an array of coordinates arranged in vertical columns and horizontal rows with the coordinate being defined by an intersection of a vertical column with a horizontal row;

concurrently stratifying the plurality of intensity values into a plurality of blocks, each block of intensity values corresponding to a preestablished set of pels belonging to the macroblock;

calculating, for each of the plurality of blocks, a block variance based upon the plurality of intensity values associated therewith thereby determining a plurality of block variances;

assigning digital video data encoding conditions to the macroblock, each encoding condition being assigned in accordance with preestablished ranges for the calculated block variances; and compressing the macroblock of digital video data in accordance with the assigned encoding conditions.

9. The method of claim 8 wherein one of the plurality of blocks is stratified for a plurality of intensity values for pels having consecutive coordinates, and at least one of said blocks is stratified for a plurality of intensity values for pels having non-consecutive coordinates.

10. The method of claim 8 wherein the calculating step includes the steps of:

summing the intensity values thereby accumulating a summed value for each block;

squaring each of the intensity values thereby determining a squared value;

summing the squared value for each block thereby accumulating a summed squared value for each block;

after accumulating, for all the pels in the macroblock, the summed value for each block, squaring the summed value accumulated for each block thereby determining a squared summed value for each block; and upon determining the squared summed value for each block, calculating the block variance by subtracting the squared summed value for the block from the summed squared value for the block.

11. The method of claim 8 wherein the steps of:

summing the intensity values for each block includes concurrently summing the intensity values for pels having consecutive coordinates while summing the intensity values for pels having non-consecutive coordinates; and summing the squared value includes concurrently summing squared values for pels having consecutive coordinates while summing squared values for pels having non-consecutive coordinates.

12. In a digital video data compression apparatus, an encoding conditions selection apparatus to determine a plurality of encoding conditions for a preselected macroblock of digital video data belonging to a frame of digital video data, the macroblock containing digital video data for a plurality of pels that are located in a region of the frame of digital video data which is smaller than an entire frame, the encoding conditions selection apparatus comprising:

stratifying means for receiving digital video data that is associated with the pels of the macroblock and concurrently stratifying the received digital video data into a plurality of blocks, each block corresponding to a preestablished set of pels belonging to the macroblock;

function evaluation means for receiving stratified digital video data for blocks of pels and for performing block function evaluations for each of the plurality of blocks using such stratified digital video data; and means, electronically coupled to an output of the function evaluation means, for receiving the block function evaluations and for determining a plurality of encoding conditions based upon the block function evaluations, the encoding conditions so determined specifying how the digital video data compression apparatus is to compress the digital video data of the macroblock.

13. The encoding conditions selection apparatus of claim 12 wherein the function evaluation means includes:

a first plurality of pairs of adders and registers equal in number to the plurality of blocks, each adder and register pair being assigned for accumulating a summed value of digital video data for a specified block, a multiplier which receives and squares each of the digital video data that is associated with the pels of the macroblock thereby determining a squared value associated with each pel, and which after the first plurality of pairs adders and registers accumulates the summed value of digital video data for a specified block, the multiplier also receives and squares such summed value thereby determining a squared summed value for the block;

a second plurality of pairs of adders and registers equal in number to the plurality of blocks, each adder and register pair being assigned for accumulating the squared values for a specified block thereby determining a summed squared value for the block, and after the multiplier determines a squared summed value for a block, the second plurality of pairs of adders and registers completes the block function evaluation by subtracting the squared summed value from the summed squared value.

14. The encoding conditions selection apparatus of claim 13 wherein the stratifying means includes at least one input multiplexer electronically coupled in parallel to the plurality of adders.

15. The encoding conditions selection apparatus of claim 14 wherein inputs of the first plurality of adders are electronically coupled in parallel to each other and to the input multiplexer, and inputs of the second plurality of adders are electronically coupled in parallel to each other and to the input multiplexer.

16. The encoding conditions selection apparatus of claim 14 wherein a single stratifying means is electronically coupled to receive all of the digital video data.

17. The encoding conditions selection apparatus of claim 15 wherein inputs of the second plurality of adders are connected in parallel to an output of the multiplier.

18. The encoding conditions selection apparatus of claim 15 wherein outputs of each of the first plurality of registers are electronically coupled to an input of a exit multiplexer.

19. The encoding conditions selection apparatus of claim 15 wherein outputs of each of the second plurality of registers are electronically coupled to an input of a output multiplexer.

20. The encoding conditions selection apparatus of claim 13 wherein:

the stratifying means receives and concurrently stratifies into blocks intensity digital video data; and the function evaluation means receives the stratified intensity digital video data and performs variance block functional evaluations using the stratified intensity digital video data.

21. The encoding conditions selection apparatus of claim 13 further comprising:

an entrance adder having both a first entrance adder input and a second entrance adder input, which entrance adder inputs sequentially and respectively receive pairs of intensity digital video data respectively for a pel of the macroblock and for a pel belonging to a different search frame of digital video data; the entrance adder producing for each successive pair of received digital video data a difference of digital video data that is associated with the pel of the macroblock; the entrance adder producing the difference of digital video data by subtracting the digital video data for the pel of the macroblock from the digital video data for the corresponding pel of the search frame; and wherein:

the stratifying means receives from the entrance adder and concurrently stratifies into blocks successive differences of digital video data produced by the entrance adder; and the function evaluation means receives the stratified differences of digital video data and performs mean squared error block functional evaluations using the stratified differences of digital video data.

* * * * *